US008757065B2

(12) United States Patent
Fjerstad et al.

(10) Patent No.: US 8,757,065 B2
(45) Date of Patent: Jun. 24, 2014

(54) METHODS AND APPARATUS FOR INTEGRATED LOCKED THRUSTER MECHANISM

(75) Inventors: Erik A. Fjerstad, Tucson, AZ (US);
Derek L. Budisalich, Tucson, AZ (US);
George D. Budy, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 2091 days.

(21) Appl. No.: 11/694,501

(22) Filed: Mar. 30, 2007

(65) Prior Publication Data

US 2011/0000361 A1 Jan. 6, 2011

Related U.S. Application Data

(60) Provisional application No. 60/787,763, filed on Mar. 30, 2006.

(51) Int. Cl.
*F42B 15/36* (2006.01)

(52) U.S. Cl.
USPC .......................................... 102/377; 89/1.14

(58) Field of Classification Search
USPC ................... 102/377, 378; 244/54, 138, 147; 89/1.14
See application file for complete search history.

(56) References Cited

U.S. PATENT DOCUMENTS

| 3,011,604 | A | * | 12/1961 | Littleworth et al. | 403/20 |
| 3,319,978 | A | * | 5/1967 | Melhose | 285/18 |
| 3,477,333 | A | * | 11/1969 | Yamamoto et al. | 411/348 |
| 3,546,999 | A | * | 12/1970 | Hosang | 89/1.14 |
| 3,640,174 | A | * | 2/1972 | Eaton | 411/548 |
| 3,674,227 | A | * | 7/1972 | Jacobson et al. | 244/121 |
| 3,903,803 | A | * | 9/1975 | Losey | 102/378 |
| 4,158,322 | A | * | 6/1979 | Hardesty | 89/1.14 |
| 4,398,366 | A | | 8/1983 | Wernicki | |
| 4,453,449 | A | * | 6/1984 | Hollmann | 89/1.806 |
| 4,628,821 | A | | 12/1986 | Madderra et al. | |
| 4,648,321 | A | * | 3/1987 | Lusk | 102/293 |
| 4,671,715 | A | * | 6/1987 | Berg | 411/8 |
| 4,867,357 | A | * | 9/1989 | Inglis et al. | 244/121 |
| 4,903,605 | A | * | 2/1990 | Dupuis | 102/377 |
| 4,906,123 | A | * | 3/1990 | Weskamp et al. | 403/322.2 |
| 4,929,135 | A | | 5/1990 | Delarue et al. | |
| 5,061,112 | A | * | 10/1991 | Monford, Jr. | 403/328 |

(Continued)

FOREIGN PATENT DOCUMENTS

WO    2006069643 A1    7/2006

OTHER PUBLICATIONS

European Search Report from corresponding European Application No. 07868210.1, mailed on Mar. 29, 2012.

*Primary Examiner* — Benjamin P Lee
(74) *Attorney, Agent, or Firm* — Renner, Otto, Boisselle & Sklar, LLP

(57) ABSTRACT

A component separation system for separating a load from an external structure according to various aspects of the present invention comprises a sleeve slidingly engaged with the external structure. The sleeve includes an opening and an interior. A locking mechanism, such as a ball or latch, is movably disposed through the sleeve opening between a locked position engaging the external structure and an unlocked position not engaging the external structure. A mover slidingly disposed within the hollow interior of the sleeve controls the movement of the locking mechanism through the opening. Energy excess beyond that required for unlocking the mechanism may provide a thrust to forcibly eject the load from the external structure.

15 Claims, 10 Drawing Sheets

(56) References Cited

U.S. PATENT DOCUMENTS

| | | | |
|---|---|---|---|
| 5,218,165 A * | 6/1993 | Cornelius et al. | 102/378 |
| 5,370,343 A | 12/1994 | Hornyak | |
| 5,400,713 A * | 3/1995 | Humiston et al. | 102/378 |
| 5,431,106 A * | 7/1995 | Dunn et al. | 102/489 |
| 5,671,650 A | 9/1997 | Aubret | |
| 6,286,409 B1 * | 9/2001 | Na et al. | 89/1.806 |
| 6,379,072 B1 * | 4/2002 | Brown et al. | 403/31 |
| 6,640,720 B1 * | 11/2003 | Biserød | 102/377 |
| 6,662,702 B1 * | 12/2003 | Vidot et al. | 89/1.14 |
| 6,679,453 B2 * | 1/2004 | Steiner | 244/121 |
| 6,758,142 B1 * | 7/2004 | Seaquist | 102/377 |
| 6,928,931 B1 * | 8/2005 | Biserød | 102/377 |
| 7,188,558 B2 | 3/2007 | Brede et al. | |
| 7,437,872 B2 * | 10/2008 | Kim et al. | 60/412 |
| 7,530,613 B2 * | 5/2009 | Kim et al. | 294/82.24 |

* cited by examiner

METHODS AND APPARATUS FOR INTEGRATED LOCKED THRUSTER MECHANISM

CROSS-REFERENCES TO RELATED APPLICATIONS

This application claims the benefit of U.S. Provisional Patent Application No. 60/787,763, filed Mar. 30, 2006, and incorporates the disclosure of such application by reference.

BACKGROUND OF THE INVENTION

Some vehicles have components that are ejected during flight. For example, various missiles, such as the tactical Tomahawk cruise missile, must eject an inlet cover following launch. The inlet cover is ordinarily coupled to the vehicle with a shear pin. When an adequate force is applied, the pin is sheared and the inlet cover is thrust away from the vehicle, with the coupling mechanism piston converting the excess pressure in the system to force to accelerate the cover away from the missile.

A careful balance between the force applied and the shear strength of the pin is required. If the shear strength of the pin is too small, the pin may prematurely shear, inadvertently decoupling the inlet cover from the vehicle. If the shear strength of the pin is too large, the force applied may not be adequate to decouple the inlet cover from the missile and the component may not be ejected when desired. The force applied may be increased, but at the risk of missile damage, increased hazard, or other ill effects.

SUMMARY OF THE INVENTION

A component separation system for separating a load from an external structure according to various aspects of the present invention comprises a sleeve slidingly engaged with the external structure. The sleeve includes an opening and an interior. A locking mechanism, such as a ball or latch, is movably disposed through the sleeve opening between a locked position engaging the external structure and an unlocked position not engaging the external structure. A mover slidingly disposed within the hollow interior of the sleeve controls the movement of the locking mechanism through the opening, with the mover and sleeve combining to thrust the assembly out of the system. Energy excess beyond that required for unlocking the mechanism may provide a thrust to forcibly eject the load from the external structure.

BRIEF DESCRIPTION OF THE DRAWING FIGURES

A more complete understanding of the present invention may be derived by referring to the detailed description and claims when considered in connection with the following illustrative figures. In the following figures, like reference numbers refer to similar elements and steps throughout the figures.

Figure 4A:
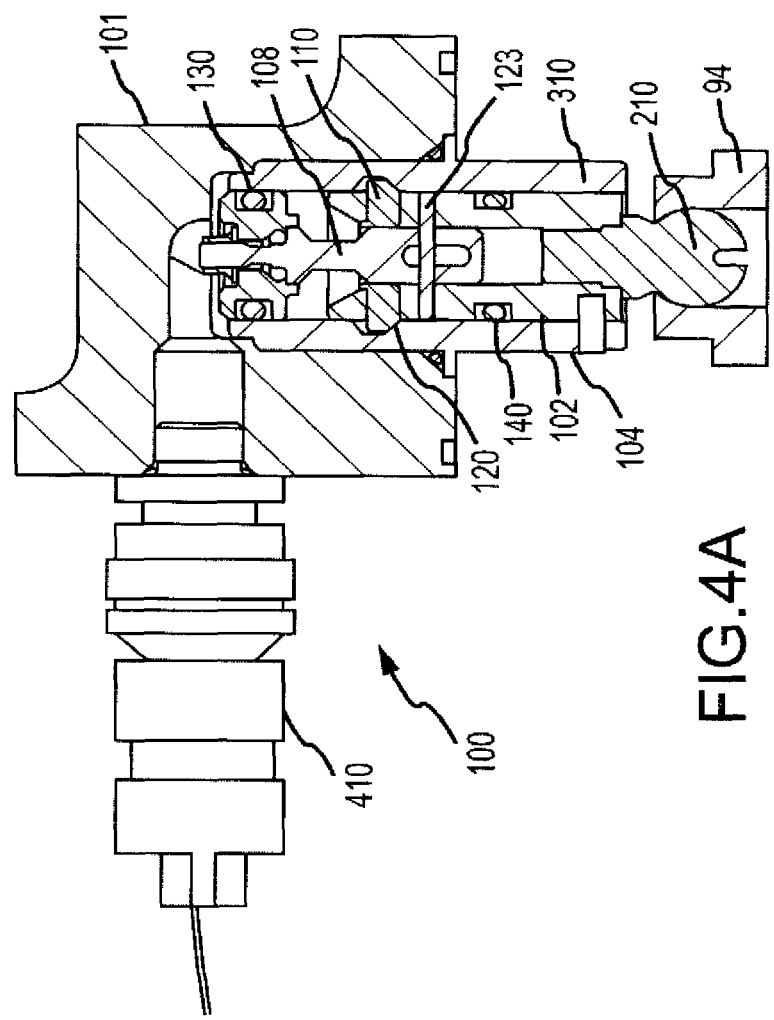
Figure 4B:
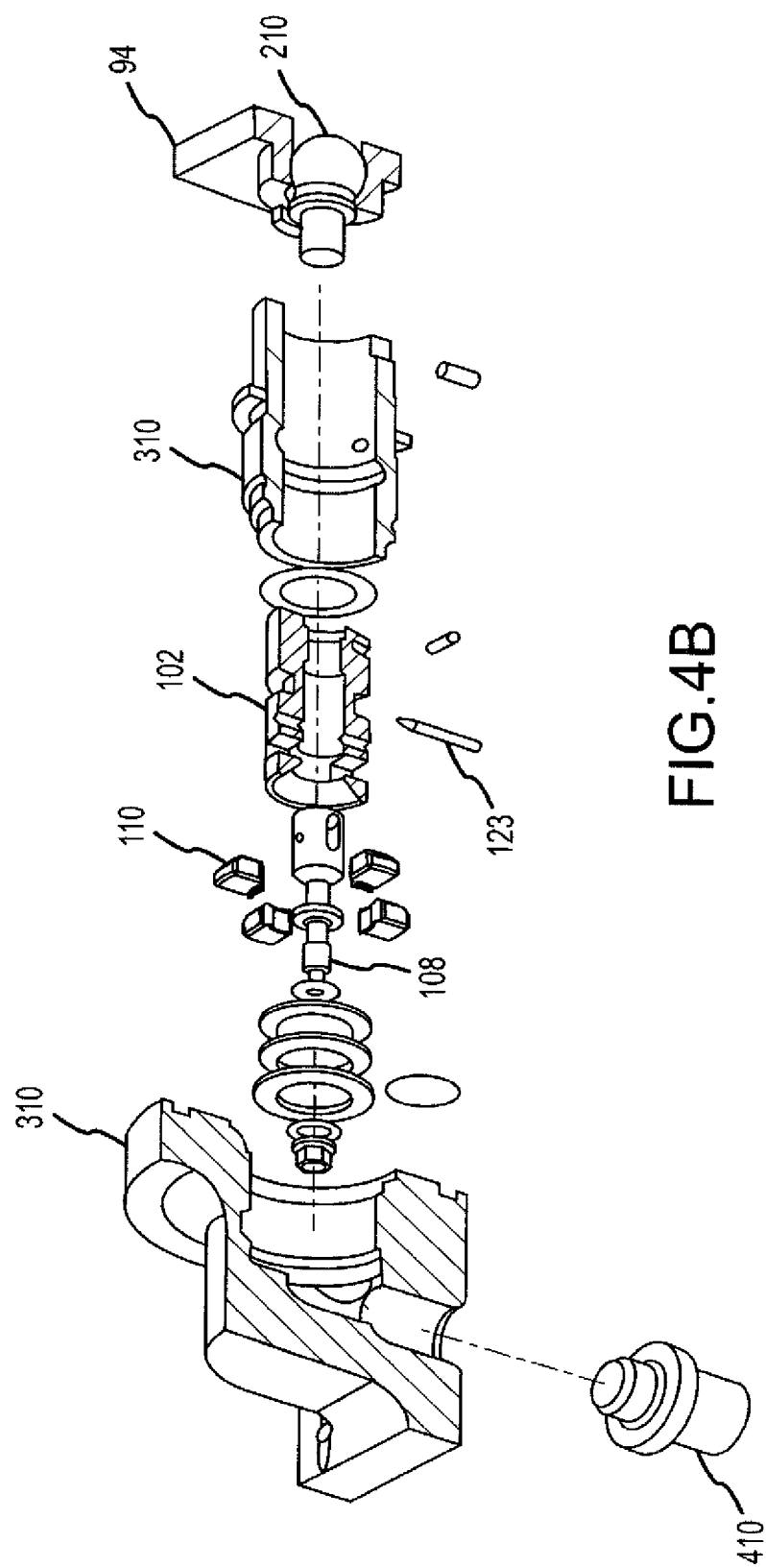

FIGS. 4A-B are a sectional view and an exploded view, respectively, of an alternative component separation system.

Figure 5A:
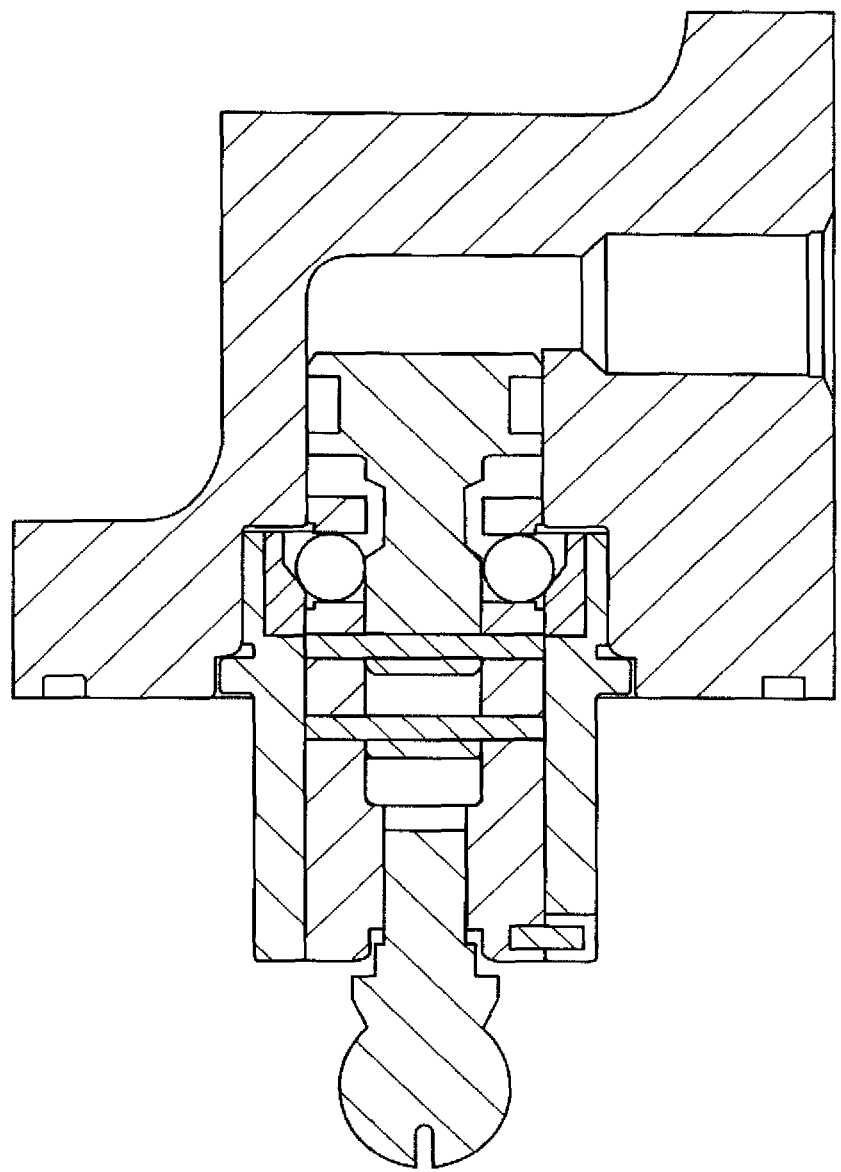
Figure 5B:
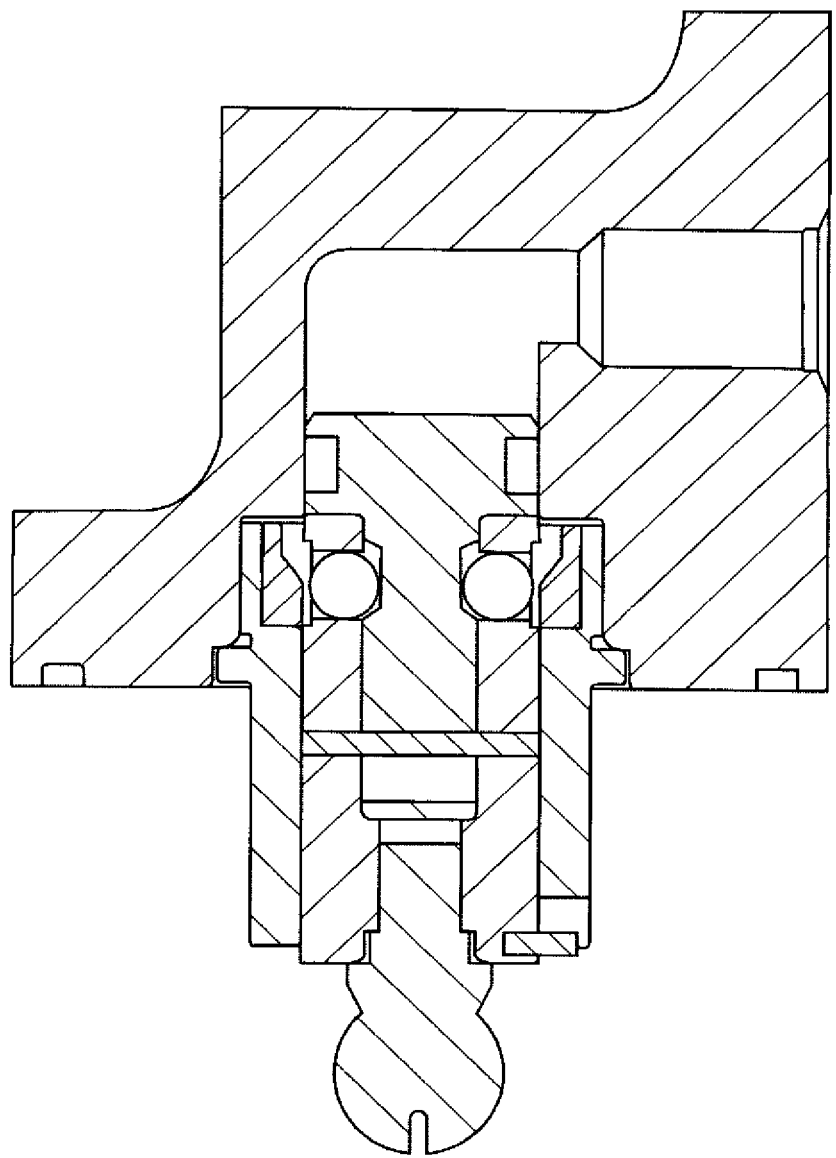
Figure 5C:
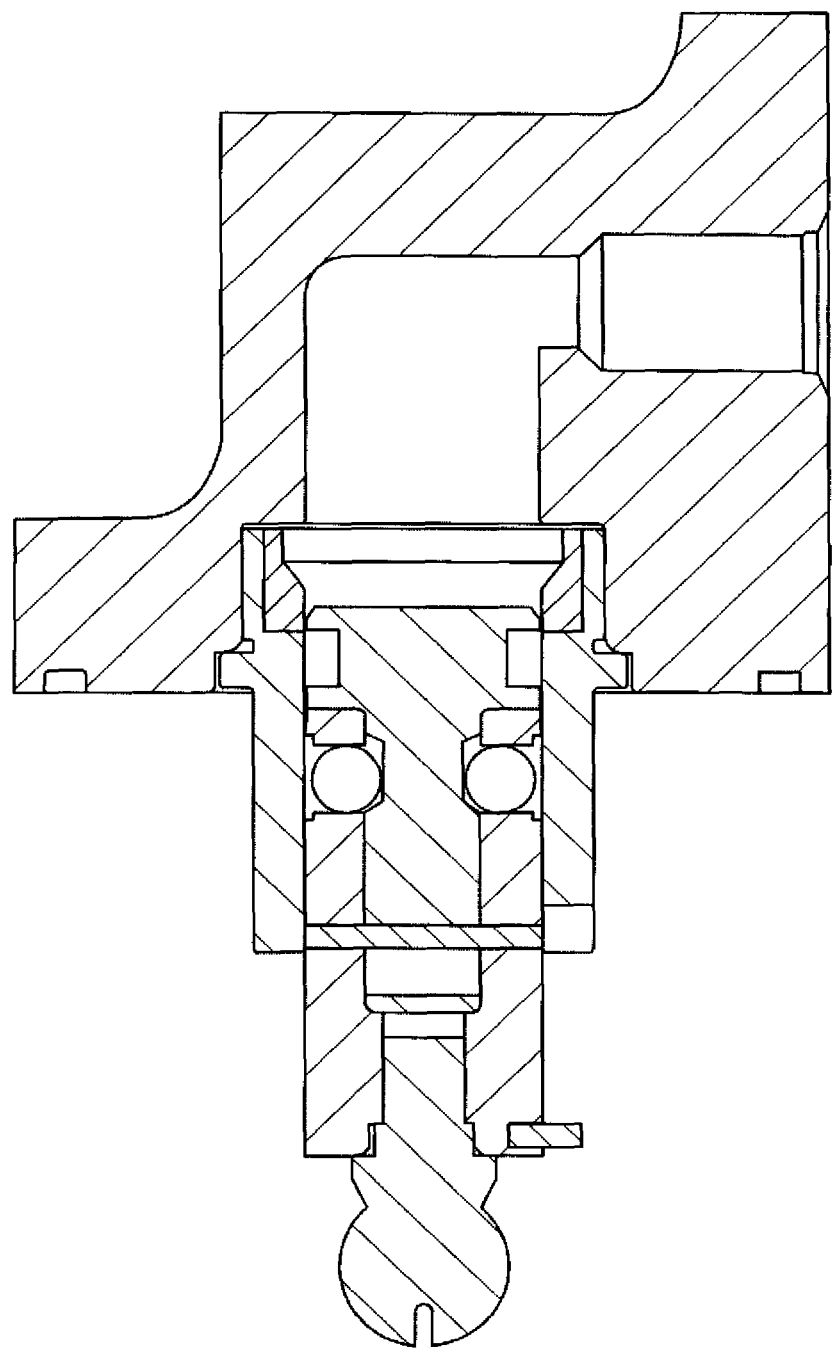

FIGS. 5A-C are sectional views of a component separation system in operation.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF THE EXEMPLARY EMBODIMENTS

The present invention is described partly in terms of functional components and various processing steps. Such functional components may be realized by any number of components configured to perform the specified functions and achieve the various results. For example, the present invention may employ various systems, vehicles, components, locking mechanisms, materials, and the like, which may carry out a variety of functions. In addition, the present invention may be practiced in conjunction with any number of applications, environments, and systems, and the embodiments described are merely exemplary applications for the invention. Further, the present invention may employ any number of conventional techniques for manufacturing, assembling, integration, and the like.

Figure 1:
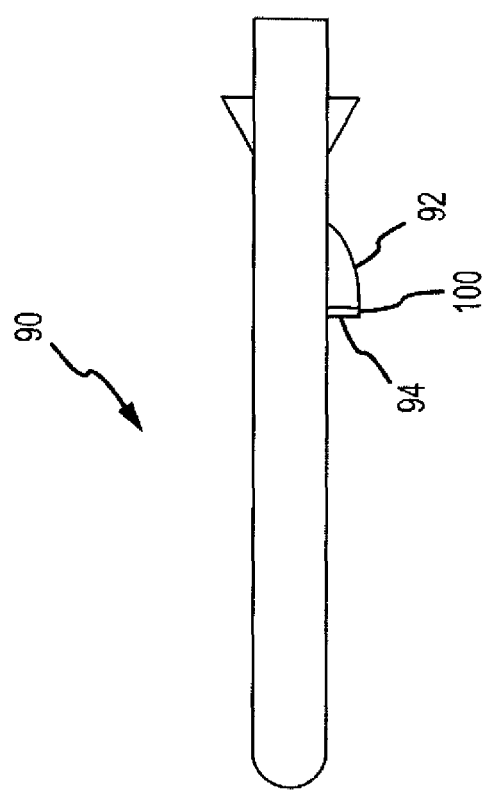
FIG. 1 is a representation of a missile including a component separation system according to various aspects of the present invention.

Referring to FIG. 1, a missile 90 according to various aspects of the present invention comprises an inlet 92 and an inlet cover 94. The inlet cover 94 is retained in position by a component separation system 100. The missile 90 may comprise any missile, such as a cruise missile, for example a tactical Tomahawk missile. Alternatively, various aspects of the present invention may be adapted for other applications requiring selectively connecting one structure to another, including other vehicles or other environments. In the present embodiment, the inlet cover 94 is connected to the missile 90 in conjunction with the component separation system 100 to release and eject the inlet cover 94 away from the inlet 92 after launching the missile 90.

The component separation system 100 facilitates release and ejection of a component or load, such as the inlet cover 94, from another body, such as the missile 90. The component separation system 100 can be used with a wide variety of vehicles, such as different types of missiles, as well as non-vehicular applications. The component separation system 100 may be configured in any appropriate manner to release the inlet cover 94 or other load in response to a signal. In the present embodiment, the component separation system 100 is configured to retain the load with a very strong retention force, but release the load in response to a relatively low force, and to provide an ejection force upon release. For example, referring to FIG. 2, an exemplary embodiment of a component separation system 100 according to various aspects of the present invention comprises a load piston 102; a mover 96; a protruder 110; and a biasing mechanism 98. The load piston 102 is connected to the load, such as the inlet cover 94, and is selectably locked in position by the protruders 110. The mover 96 controls the movement of the protruders 110 to move them between a locked position and an unlocked position. The biasing mechanism 98 retains the mover 96 in position until a selected threshold force is applied to the mover 96.

The component separation system 100 engages an external structure 101, such as the missile 90 body proximate the inlet 92. The external structure 101 comprises a structure from which the load is to be separated. The external structure 101 may comprise any structure from which the load is to be selectably separated, such as the missile, another type of vehicle, or other structure. For example, the external structure 101 may comprise a surface 97 of the missile 90 near or comprising part of the inlet 92. The surface 97 in the present embodiment defines a cylinder 104, such as a cylindrical hole, to slidably receive the load piston 102.

The external structure 101 may also include additional structure to facilitate installing the component separation system 100. For example, referring to FIGS. 3A-C and 4A-B, the external structure 101 may comprise an outer sleeve 310 that may be connected to the missile 90 body or other structure, such as via threads or other appropriate connector. In alternative embodiments, the cylinder 104 mounted or formed at least partially outside of external structure 101.

In the present embodiment, the external structure 101 selectably couples to the component separation system 100, such as by engaging the protruders 110 or other selectable locking mechanism. The cylinder 104 may include any features to accommodate operation with the component separation system 100. For example, the cylinder 104 may define a cavity 120, such as an indentation or a groove, to engage the protruders 110. The cavity 120 may be configured in any manner, such as to mate with one end of the protruder 110. The cavity 120 may be formed in any appropriate manner, such as integrated into the surface 97 of the external structure 101 or defined by a cavity component 312 of the external structure 101.

The load piston 102 may be selectably connected to the external structure 101 via the locking mechanism, such as the protruders 110, and is connected to the load. The load piston 102 may comprise any system or element to be selectably connected to the external structure 101 via the locking mechanism, and may be adapted to the external structure 101, the locking mechanism, and/or according to other considerations. In the present embodiment, the load piston 102 comprises a sleeve, such as a generally tube-like element having a hollow interior portion and a cylindrical outer surface configured to slide in and out of the cylinder 104. In addition, the load piston 102 is connected to the load in any suitable manner, such via welds or fasteners. Alternatively, the load piston 102 and the load may comprise a single unit. In the present embodiment, the load piston 102 is connected to the inlet cover 94 via a ball connection 210. In addition, the load piston 102 may include any other appropriate elements to function in the relevant application or environment, such as an o-ring 140 or other sealing mechanism between the load piston 102 and the cylinder 104.

The load piston 102 operates in conjunction with the locking mechanism to facilitate selective release, and thrusting away, of the load piston 102 from the external structure 101. In the present embodiment, the load piston 102 is configured to engage the protruders 110 and permit the protruders 110 to engage the cylinder 104. For example, the load piston 102 may include one or more holes or other variations in the surfaces or edges of the load piston 102 through which the protruders 110 may protrude and engage the load piston 102. In the present embodiment, the holes are aligned with the cavity 120 in cylinder 104 when the locking mechanism is locked.

The mover 96 moves in response to a force to move the protruders 110 from a locked position to an unlocked position. The mover 96 may comprise any system for controlling the protruders 110, such as a member having two levels that may alternately engage and move the protruders 110. In the present embodiment, the mover 96 comprises a plunger piston 108 disposed at least partially and slidably within the hollow interior of the load piston 102. The mover 96 may include any other characteristics or elements for operation in the particular environment or application. For example, the mover 96 may include a sealing mechanism to contain gases associated with activation and/or prevent contamination, such as an o-ring 130 around the exterior perimeter of a head 99 of the plunger piston 108.

The plunger piston 108 suitably comprises a cylindrical outer surface defining at least two different diameters, for example via a groove 122 around the load piston 102. The plunger piston 108 may move axially within the load piston 102 to alternately engage the protruders with different portions of the plunger piston's 108 outer surface. The larger diameter may abut the protruders 110 in the locked position, and the groove 122 may be aligned with the protruders 110 in the unlocked position. The groove 122 may comprise any shape or cavity to receive the protruders 110. For example, the groove 122 may have a cross-sectional shape to accommodate the protruders 110. The groove 122 may alternatively comprise multiple cavities or the like to accommodate the protruders 110. Alternatively, the plunger piston 108 may comprise a constant diameter outer surface. To move the protruders 110 to the unlocked position, the plunger piston 108 may be withdrawn or otherwise moved such that the plunger piston 108 no longer engages the protruders 110.

The mover 96 may respond to any force. For example, the component separation system 100 may include a motor, pneumatic source, hydraulic source, explosive, or other source of force to move the mover 96 relative to the protruders 110. In the present embodiment, the plunger piston 108 responds to a force applied to a head 99 of the plunger piston 108, such as via mechanical force, electromagnetic force, an explosive or other pyrotechnic device or pressure source.

In the present embodiment, the force is supplied by a squib 410 housed within the missile 90 and in communication with the cavity 104 and the mover 96 such as to selectively apply a force to the mover 96 (FIG. 4A). The squib 410 ignites and pressurizes the interior of the cylinder 104. The force applied by the squib 410 is sufficient to overcome the force applied by the biasing mechanism 98. In addition, the force applied may force the load piston 102, the mover 96, and the load away from the external structure 101 so as to eject them from the external structure 100. Thus, the squib 410 provides a thruster function as well as an unlocking function.

Figure 2:
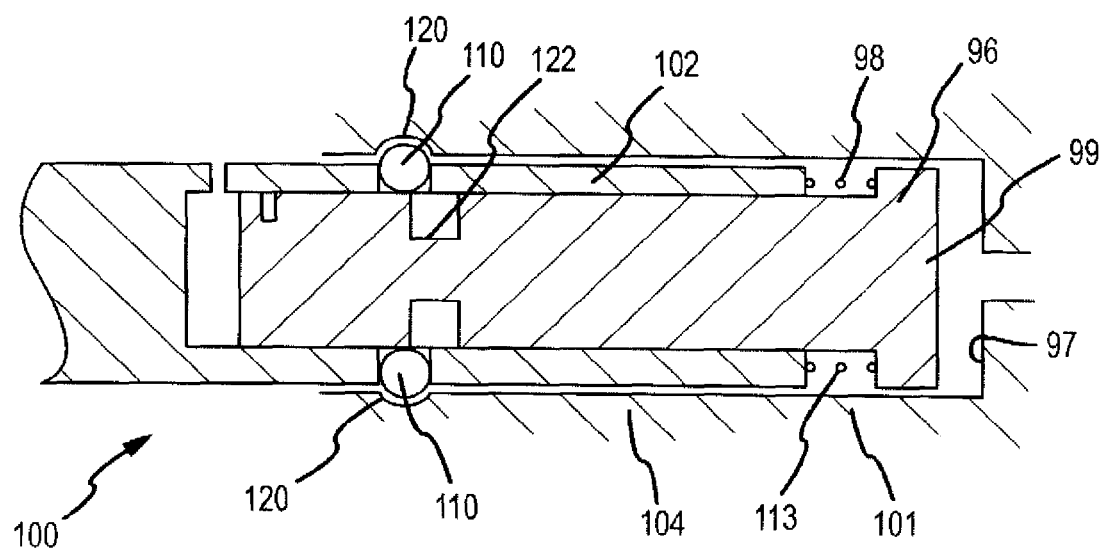
FIG. 2 is a section view of a component separation system.
Figure 3A:
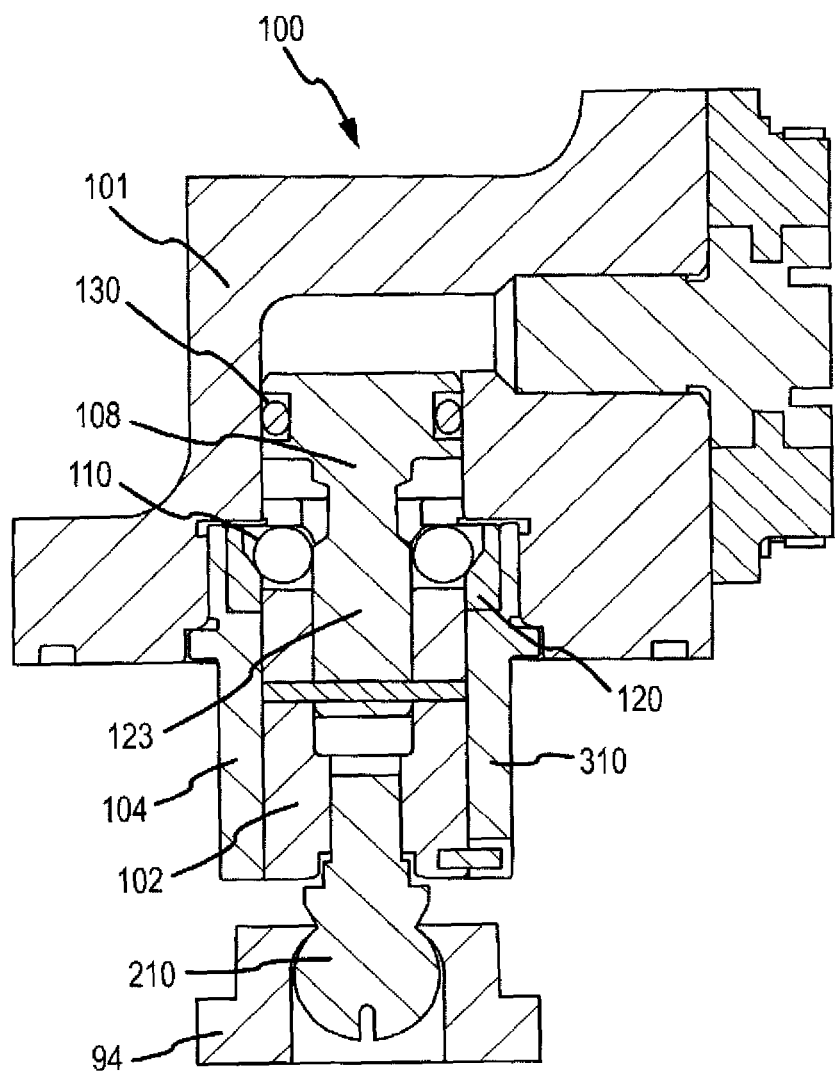
FIG. 3A is a sectional view of an alternative component separation system.
Figure 3B:
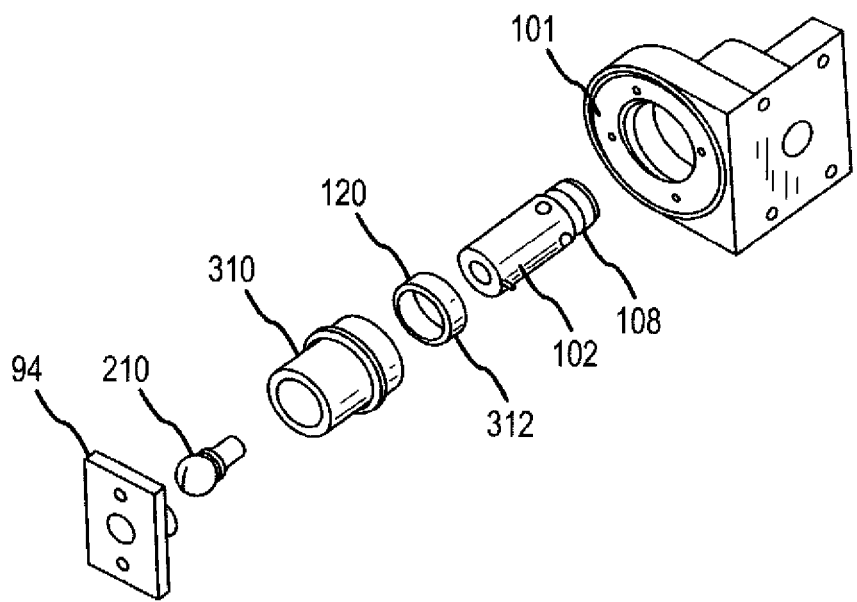
FIG. 3B is an exploded view of the component separation system of FIG. 3A.
Figure 3C:
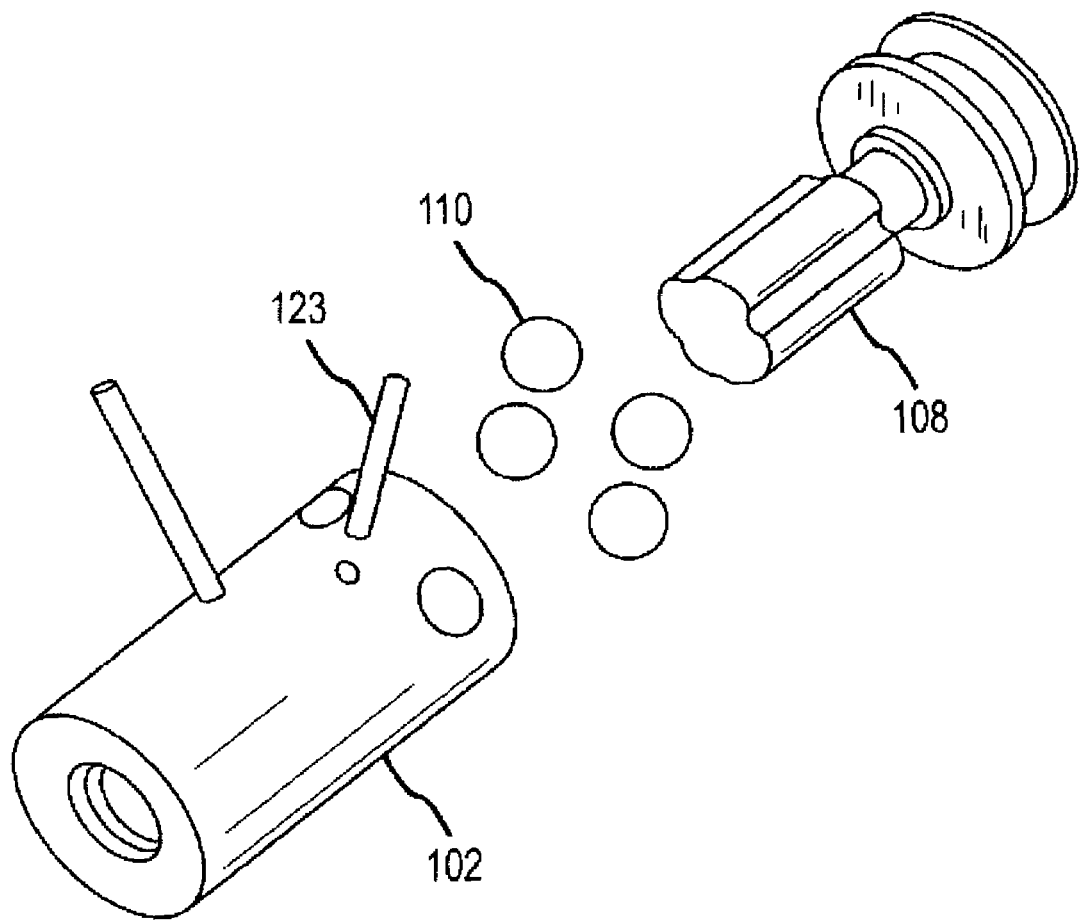
FIG. 3C is an exploded view of a subassembly of FIG. 3B.

The mover 96 may be held in position relative to the load piston 102 by the biasing mechanism 98. The biasing mechanism 98 may comprise any appropriate system for maintaining the relative positions of the mover 96 and the load piston 102 or to otherwise maintain a locked or unlocked position until the locking mechanism is actuated. Referring to FIG. 2, in one embodiment, the biasing mechanism 98 may comprise a spring 113 between the head 99 of the plunger piston 108 and one edge of the load piston 102. In another embodiment, referring to FIGS. 3A-C and 4A-B, the biasing mechanism 98 may comprise a shear pin 123 abutting one end of the plunger piston 108 and engaging the load piston 102 and/or the external structure 101 such that the force needed to move the plunger piston 108 relative to the load piston 102 depends on the shear force needed to break the shear pin 123. The biasing mechanism 98 may be configured in any appropriate manner to allow the plunger piston 108 to move with respect to the load piston 102 in response to a selected threshold force applied to the plunger piston 108.

The protruders 110 move through the holes 124 formed in the load piston 102 and selectably engage the external structure 101. The protruder 110 may comprise any suitable protruder for engaging the external structure 101, such as one or more rods, balls, hooks, or the like. The protruder 110 moves in any manner, such as by sliding or rolling. Referring to FIGS. 2 and 3A-C, the protruder 110 may comprise a ball formed of a hard material, such as a ball bearing. Each ball may have a diameter greater than the smallest diameter of the hole 124 in the load piston 102, which may be tapered or swaged to retain the ball. Each protruder 110 may be aligned with one of the holes 124 and moved to partially extend through the hole 124 beyond the radial surface of the load piston 102 and engage the cylinder 102, or withdrawn within the load piston 102 so that less or none of the protruder 110 engages the cylinder 104.

In another embodiment, referring to FIGS. 4A-B, the protruders 110 may comprise one or more latches 127. The latches 127 movably engage the plunger piston 108 and extend outwardly. Each latch 127 may include a tapered surface to facilitate retraction of the latches 127 when aligned with the plunger piston groove 122. In response to a force applied to the plunger piston 108, each latch 127 is pushed inwardly towards the plunger piston 108. The surface of the cylinder cavity 120 may be likewise tapered to facilitate retraction of the protruders 110.

Referring to FIGS. 5A-C, the protruders 110 may move through the holes 124 in the load piston 102 between a locked position (FIG. 5A) and an unlocked position (FIG. 5C). In the locked position, referring to FIG. 5A, the load piston holes 124 are adjacent the cavity 120 in the cylinder 104 and the protruders 110 extend through the load piston holes 124 to engage the cavity 120 to restrict movement of the load piston 102 relative to the external structure 101. The plunger piston 108 abuts the opposite side of the protruder 110 so that the protruder 110 cannot withdraw from the cavity 120. As a result, the load piston 102 is coupled to the external structure 101 and the separation system 100 is in a locked condition.

Referring to FIG. 5C, in the unlocked position, the plunger piston 108 groove 122 is adjacent to the load piston holes 124 and the protruder 110 retracts into the plunger piston groove 122 through the load piston holes 124, effectively locking the plunger piston 108 to the load piston 102. Further, the load piston 102 can move relative to the external structure 101. Thus, the load piston 102 and the separation system 100 are unlocked from the external structure 101.

The number of protruders 110 may be selected to provide a desired coupling force between the load piston 102 and the external structure 101. Generally, the coupling force is larger as the number of protruders 110 increases. For example, if the cylinder 104 includes four cavities and the load is heavy, then the component separation system 100 may include four protruders 110 to increase the coupling force. If the load is lighter, then one, two, or three protruders 110 may be used to provide a smaller coupling force. Thus, the coupling force may be selected according to the anticipated load.

In operation, the component separation system 100 is initially locked to the external structure 101. For example, referring to FIG. 5A, the plunger piston 108 is held in the locked position by the biasing mechanism 98. The plunger piston 108 retains the protruders 110 in an extended position such that the protruders engage the cylinder 104 cavity 120 through the holes in the load piston 102.

To separate the load from the external structure 101, the mover 96 is moved to unlock the locking mechanism from the external structure. Referring to FIG. 5B, in the present embodiment, the squib 410 is fired to pressurize the interior of the cavity 104. The pressure within the cavity 104 builds enough to overcome the biasing mechanism 98, such as enough to compress the spring 113 or breaking the shear pin 123. The plunger piston 108 may then move axially within the load piston 102. The plunger piston 108 travels until the plunger piston groove 122 is aligned with the protruders 110.

Referring to FIG. 5C, the force from the squib 410 pushes the load piston 102 away, causing the protruders 110 to withdraw into the load piston 102, unlocking the load piston 102 from the cylinder 104. The pressure from the squib also forces the unlocked load piston 102 out of the cylinder 104, thus decoupling the load from the external structure 101.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The present invention has been described above with reference to a preferred embodiment. However, changes and modifications may be made to the preferred embodiment without departing from the scope of the present invention. These and other changes or modifications are intended to be included within the scope of the present invention.

The invention claimed is:

1. A component separation system for separating a load from a missile, comprising:
   a sleeve slidingly engaged with the missile, comprising:
      an opening surface defining an opening; and
      an interior surface defining a hollow interior;
   a locking mechanism movable through the sleeve opening between a locked position engaging the missile and an unlocked position not engaging the missile;
   a mover slidingly disposed within the hollow interior of the sleeve, wherein the mover engages the locking mechanism and controls the movement of the locking mechanism through the opening; and
   a pressure source in communication with the mover, wherein the pressure source is configured to apply a force to the mover, and wherein the force is selected to move the mover within the hollow interior of the sleeve and eject the mover and the sleeve from the missile; and
   a ball connector fixedly attached to the sleeve, for mechanically coupling the sleeve to the load;
   wherein the pressure source comprises a pyrotechnic device.

2. The component system of claim 1, further comprising an outer structure attached to the missile, wherein the sleeve is disposed within the outer structure.

3. The component system of claim 1, wherein the mover comprises an exterior surface engaging the locking mechanism, wherein the exterior surface defines a first level engaging the locking mechanism when the axial mover is in a first position and a second level engaging the locking mechanism when the axial mover is in a second position.

4. The component system of claim 1, wherein the locking mechanism comprises a ball.

5. The component system of claim 1, wherein the locking mechanism comprises a latch.

6. The component separation system of claim 5, wherein the latch has a tapered surface.

7. The component system of claim 1, further comprising a biasing element applying a biasing force to the mover.

8. The component separation system of claim 7, wherein the biasing element comprises a spring disposed between the mover and the sleeve.

9. The component separation system of claim 7, wherein the biasing element comprises a shear pin engaging the mover and the sleeve.

10. The component separation system of claim 1, wherein the pyrotechnic device is a squib.

11. The component separation system of claim 10, wherein the squib is in communication with a pressure cavity within the sleeve that is between a head of the mover and an end surface of the sleeve.

12. The component separation system of claim 11, wherein the squib also provides a thruster function, with pressure in the cavity pushing the load away from the missile.

13. The component separation system of claim 1,
wherein the mover is a plunger piston that has a head that is outside the sleeve; and
further comprising a biasing element applying a biasing force to the mover;
wherein the biasing element is a spring in contact with both the sleeve and the head of the plunger piston.

14. The component separation system of claim 1, wherein the mover includes a sealing mechanism to contain gasses from the pyrotechnic device.

15. The component separation system of claim 14, wherein the sealing mechanism is an O-ring around a perimeter of a head of the mover.

* * * * *